(12) United States Patent
Shimizu et al.

(10) Patent No.: US 7,770,907 B2
(45) Date of Patent: Aug. 10, 2010

(54) ALL TERRAIN VEHICLE

(75) Inventors: Katsuhisa Shimizu, Shizuoka (JP);
Yasuhiro Suzuki, Shizuoka (JP)

(73) Assignee: Yamaha Hatsudoki Kabushiki Kaisha,
Shizuoka (JP)

( * ) Notice: Subject to any disclaimer, the term of this patent is extended or adjusted under 35 U.S.C. 154(b) by 295 days.

(21) Appl. No.: 11/336,496

(22) Filed: Jan. 20, 2006

(65) Prior Publication Data

US 2007/0170683 A1    Jul. 26, 2007

(51) Int. Cl.
*B60G 3/04* (2006.01)
(52) U.S. Cl. .................. 280/124.134; 280/124.135; 280/124.136
(58) Field of Classification Search ............... 280/781, 280/124.134, 124.135, 124.136; 180/376
See application file for complete search history.

(56) References Cited

U.S. PATENT DOCUMENTS

| | | | | |
|---|---|---|---|---|
| 4,620,715 A * | 11/1986 | Takahashi | ............... | 280/269 |
| 4,817,985 A * | 4/1989 | Enokimoto et al. | ......... | 280/788 |
| 4,828,017 A * | 5/1989 | Watanabe et al. | ............. | 165/41 |
| 5,251,713 A * | 10/1993 | Enokimoto | ................. | 180/68.4 |
| 6,250,415 B1 * | 6/2001 | Seto | ........................... | 180/337 |
| 6,286,619 B1 * | 9/2001 | Uchiyama et al. | ........... | 180/337 |
| 6,691,815 B2 * | 2/2004 | Rioux et al. | ................. | 180/292 |
| 6,695,083 B2 * | 2/2004 | Nakamura et al. | ......... | 180/68.1 |
| 6,702,058 B2 * | 3/2004 | Ishii et al. | .................... | 180/311 |
| 6,805,217 B2 | 10/2004 | Kinouchi et al. | | |
| 6,892,847 B2 * | 5/2005 | Seiki | .......................... | 180/376 |
| 6,920,949 B2 * | 7/2005 | Matsuura et al. | ........... | 180/68.2 |
| 7,287,619 B2 * | 10/2007 | Tanaka et al. | ............... | 180/291 |

* cited by examiner

*Primary Examiner*—Toan C To
(74) *Attorney, Agent, or Firm*—Keating & Bennett, LLP

(57) ABSTRACT

An all terrain vehicle includes left and right vehicle body frame portions and left and right suspension arms, respectively suspending left and right rear wheels, and capable of moving up and down together with the left and right rear wheels. The left and right vehicle body frame portions have a portion bent toward the center in a vehicle width direction, and a suspension arm support portion connected to the bent portion toward the rear of the vehicle and inclined to the center in the width direction of the vehicle. The left and right suspension arms are connected to the pair of left and right suspension arm support portions. The all terrain vehicle is provided with a more compact frame.

6 Claims, 7 Drawing Sheets

ALL TERRAIN VEHICLE

BACKGROUND OF THE INVENTION

1. Field of the Invention

The present invention relates to an all terrain vehicle for running on uneven ground such as wasteland, grassland and swamps. More particularly, the present invention relates to technology for a vehicle body frame.

2. Description of the Related Art

An all terrain vehicle with an independent suspension for each of the left and right rear wheels is generally provided with a vehicle body frame including left and right suspension arm support portions at a rear portion of the vehicle. Left and right suspension arms that are capable of moving up and down are respectively connected to the left and right suspension arm support portions. The rear wheels are supported at the tip end of these suspension arms (refer to U.S. Pat. No. 6,805,217).

FIG. 7 is a plan view of a vehicle body frame provided in a conventional all terrain vehicle. As shown in FIG. 7, left and right suspension arm support portions 101 are parallel to each other. Therefore, it is easier to connect other parts of the vehicle to the suspension arms 102.

However, in the vehicle body frame 100 including these types of parallel suspension arm support portions 101, there is a desire to shorten the frame rear portion and make the vehicle more compact. Specifically, since the center portions 103 of the vehicle body frame support an engine 104 etc., a distance between the left and right portions 103 is wide. At a position toward the back from the central portions 103, left and right vehicle body frames 100 respectively include two bent portions. More specifically, each of the vehicle body frames 100 is bent inwardly in a vehicle width direction at a rear end portion 103a of the central portion 103. Inclined portions 105 extending from these rear end portions 103a extend backward and inward (to the center in the vehicle width direction). Then, each of the vehicle body frames 100 is bent again outward in the vehicle width direction at the rear end portion 105a of the inclined portion 105. The suspension arm support portions 101 extending from the inclined portions 105 become parallel to each other. A distance between the left and right suspension arm support portions 101 is narrower compared to the central portions 103.

In vehicle body frames 100 constructed in this way, if the entire frame is made shorter, a distance between the two bent positions 103a and 105a, that is, the length of the inclined portion 105, must also be shortened. Together with shortening of the inclined portion 105, in order to make a distance between the left and right suspension arm support portions 101 be narrow and parallel in manner similar to that described above, it becomes necessary to bend each of the vehicle body frames 100 sharply at the two bent portions 103a and 105a. However, processing the frame in this manner is difficult.

SUMMARY OF THE INVENTION

In order to overcome the problems described above, preferred embodiments of the present invention provide an all terrain vehicle with a more compact frame.

According to a preferred embodiment of the present invention, an all terrain vehicle is provided with left and right vehicle body frame portions extending in a front and rear direction of the vehicle, and left and right suspension arms, respectively suspending left and right rear wheels, capable of moving up and down together with the left and right rear wheels. The left and right vehicle body frame portions include bent portions bent inward in a vehicle width direction and left and right suspension arm support portions extending from the bent portions towards the rear, and inclined inward in the vehicle width direction. The left and right suspension arms are connected to the suspension arm support portions.

According to another preferred embodiment of the present invention, the vehicle body frame portion is bent inward in a vehicle width direction at the bent portions. The suspension arm support portions extending from these bent portions incline inward, and are connected to the suspension arms. As a result, there is no need for the difficult frame processing of bending the rear portions of the vehicle body frame portions at two places and making the suspension arm support portions parallel. This means that a compact all terrain vehicle including a short vehicle body frame can be obtained.

According to another preferred embodiment of the present invention, left and right rear wheel drive shafts are further provided and connected to the left and right rear wheels for conveying a drive power. The left and right rear wheel drive shafts extend diagonally to the rear and outwardly in the vehicle width direction.

In the present preferred embodiment, since the rear wheel drive shafts extend diagonally backward and outward in the width direction of the vehicle, it is possible to provide a compact vehicle body frame while arranging the rear wheels further to the rear. As a result, the rear portion of the vehicle is prevented from contacting the ground when the vehicle is running, even if the vehicle greatly moves up and down.

According to another preferred embodiment of the present invention, each of the suspension arm support portions is provided with frame side pivot shafts for supporting the suspension arm so as to be capable of moving up and down, and each of the suspension arms is provided with wheel side pivot shafts for suspending the rear wheel so as to be capable of moving up and down. Each of the frame side pivot shafts of the suspension arm support portions is parallel to the wheel side pivot shaft of the suspension arm.

In this present preferred embodiment, since the frame side pivot shafts of the suspension arm support portions and the wheel side pivot shafts of the suspension arms are parallel with each other, the suspension arms are capable of moving up and down smoothly.

According to another preferred embodiment of the present invention, each of the suspension arms includes an upper arm and a lower arm arranged below the upper arm and connected to the suspension arm support portion.

According to this preferred embodiment, since the lower arms connected to the suspension arm support portions are arranged below the upper arms, the suspension arm support portions define a lower portion of the vehicle body frame. The suspension arm support portions extending rearward from the bent portions of the vehicle body frame portions are inclined inward in the vehicle width direction. Therefore, the lower portion of the vehicle body frame is shortened. This means that even if the vehicle greatly moves up and down when running, the rear lower portion of the vehicle is prevented from coming into contact with the ground.

Also, with this preferred embodiment, it is also possible to further provide shock absorbers for damping vibrations of the vehicle when running. Upper ends of the shock absorbers are connected to the vehicle body frame portion, and lower ends of the shock absorbers are connected to the lower arm. In doing this, since the lower ends of the shock absorbers are connected to the lower arms, and the center of gravity of the vehicle is lowered, it is possible to ensure a comfortable ride even if the vehicle runs over uneven ground.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
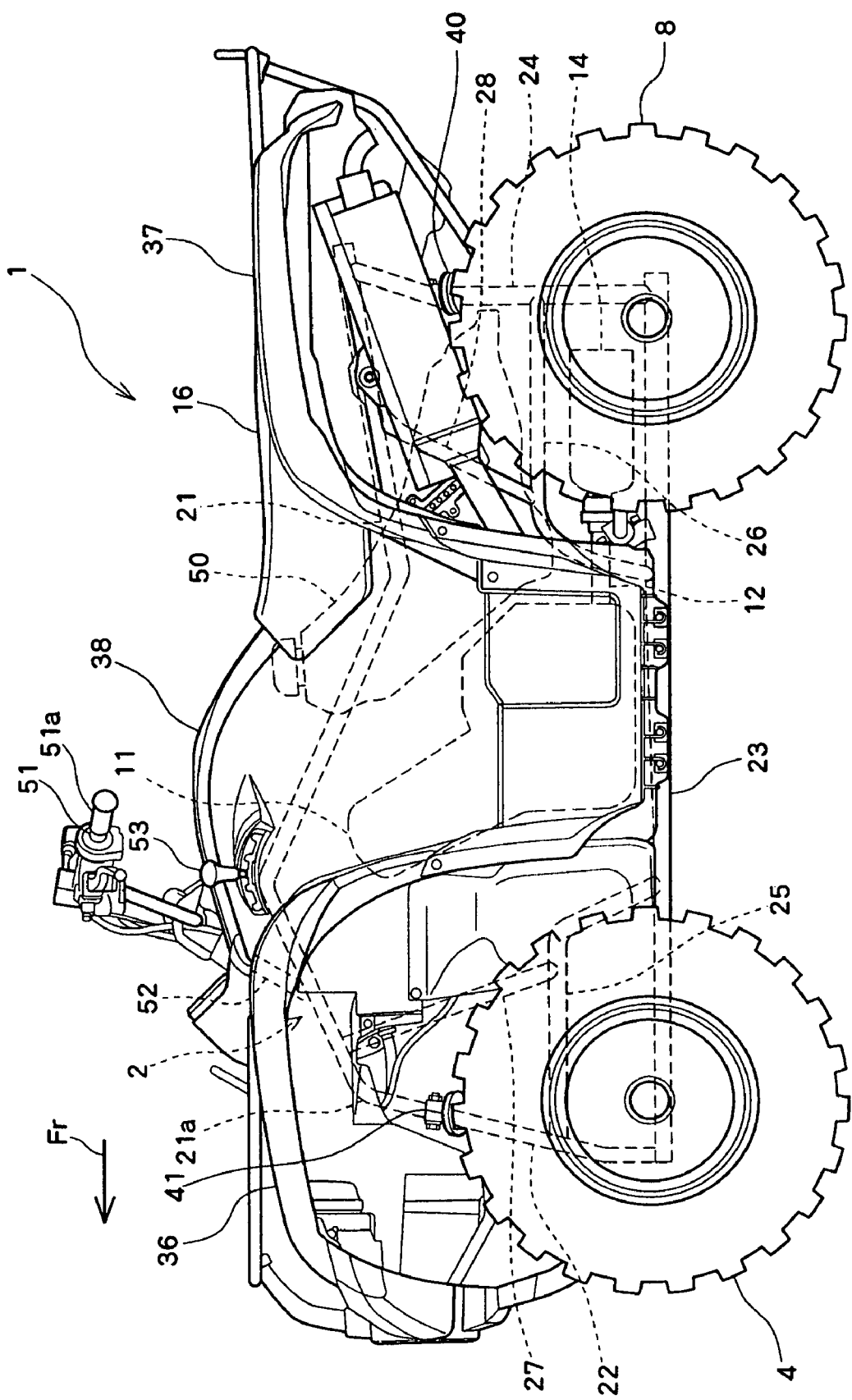
FIG. 1 is a left side elevation view of an all terrain vehicle of a preferred embodiment of the present invention.
Figure 2:
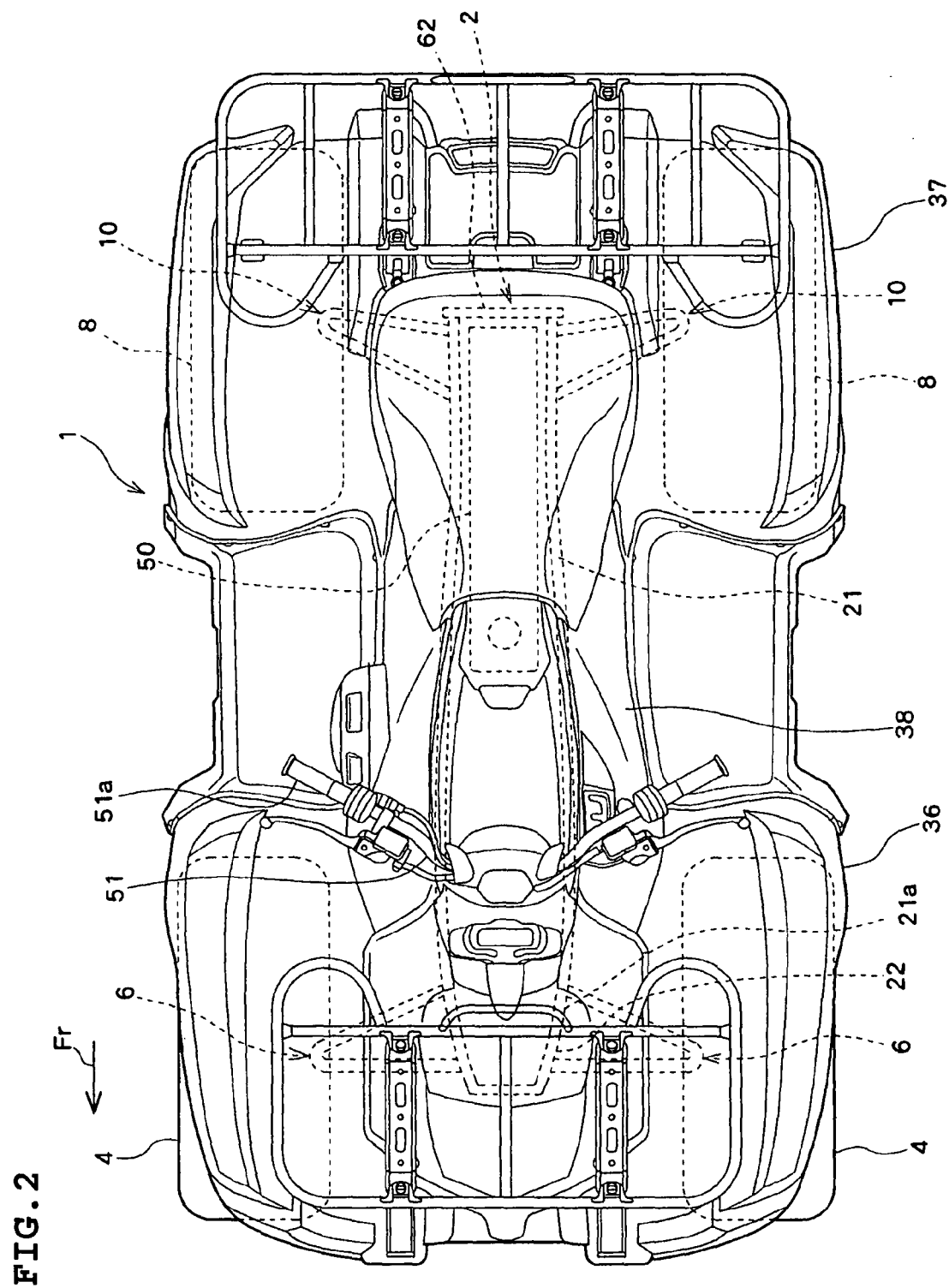
FIG. 2 is a plan view of the all terrain vehicle of FIG. 1.
Figure 3:
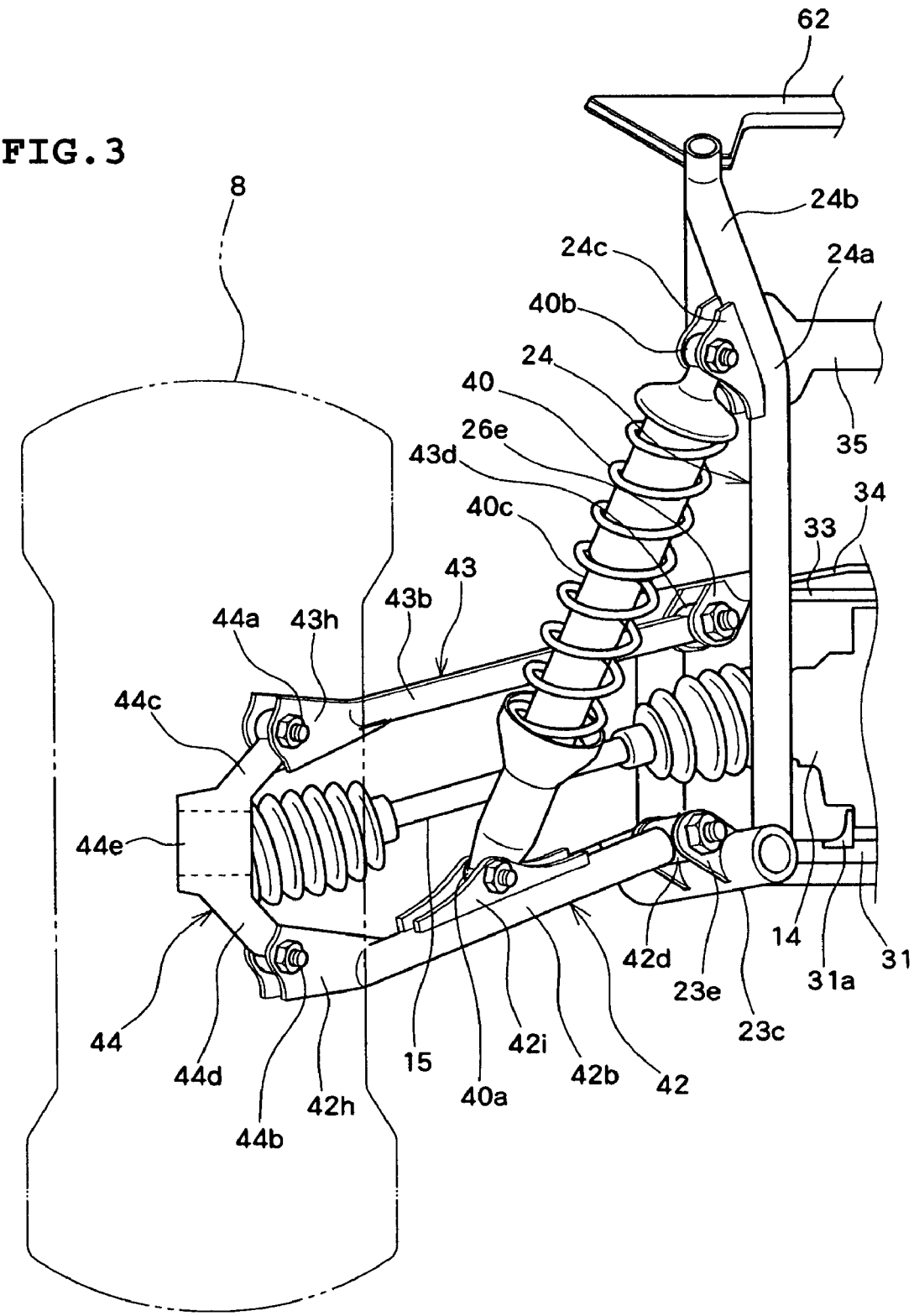
FIG. 3 is a rear view of rear wheel suspensions mounted on the all terrain vehicle.
Figure 4:
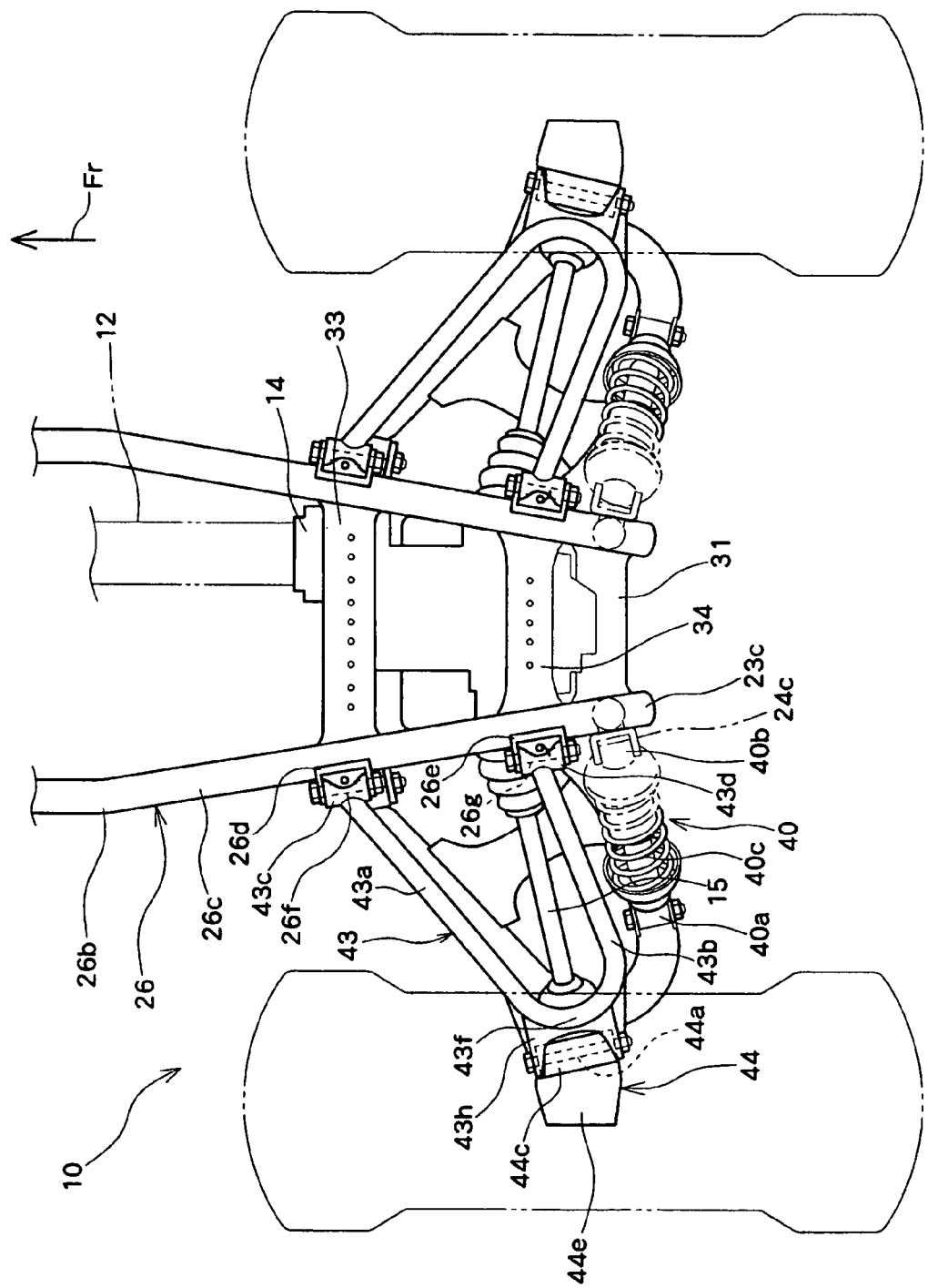
FIG. 4 is a plan view of the rear wheel suspensions, wherein upper portions of shock absorbers included in the rear wheel suspension are shown by chain two-dotted lines.
Figure 5:
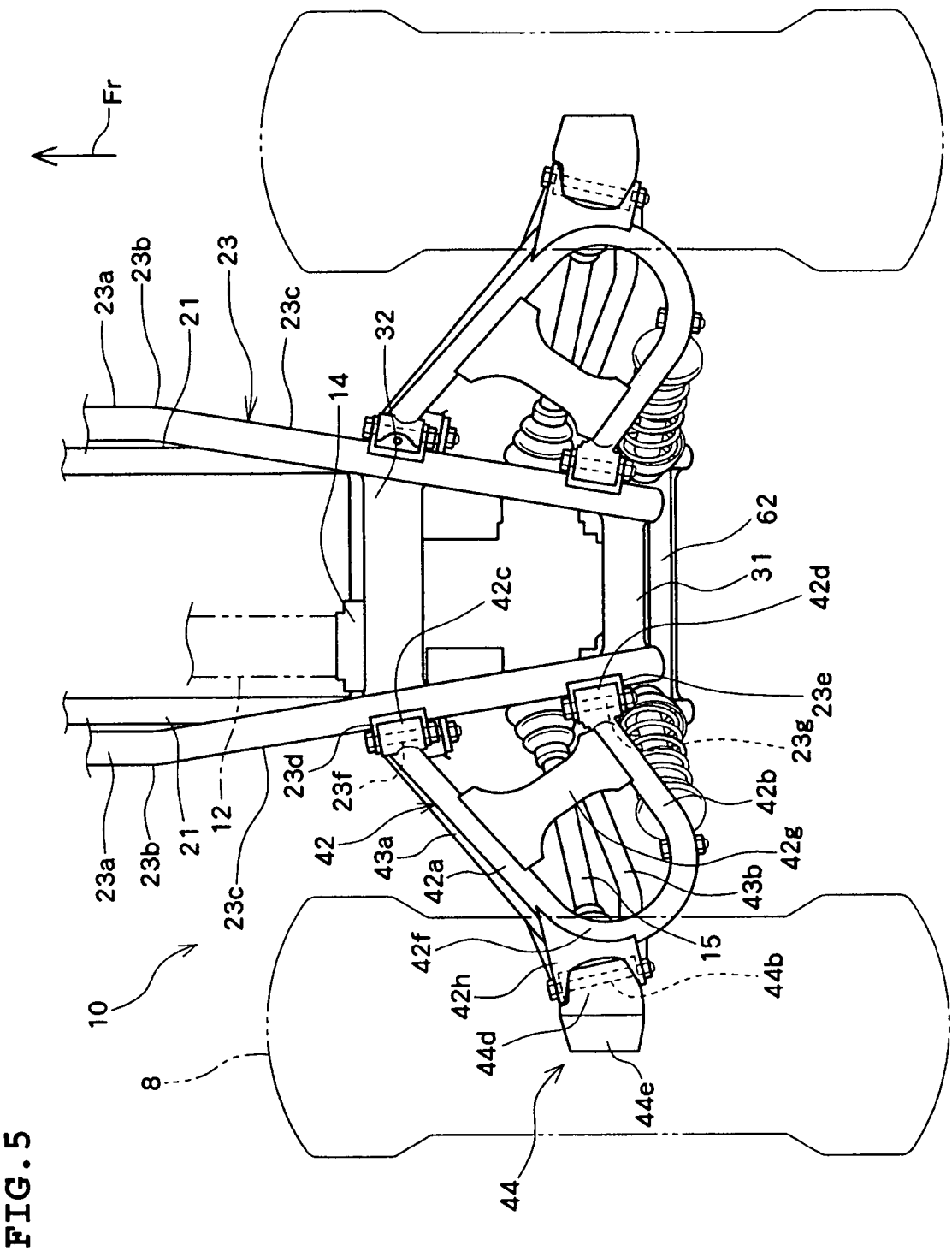
FIG. 5 is a bottom view of the rear wheel suspensions.
Figure 6:
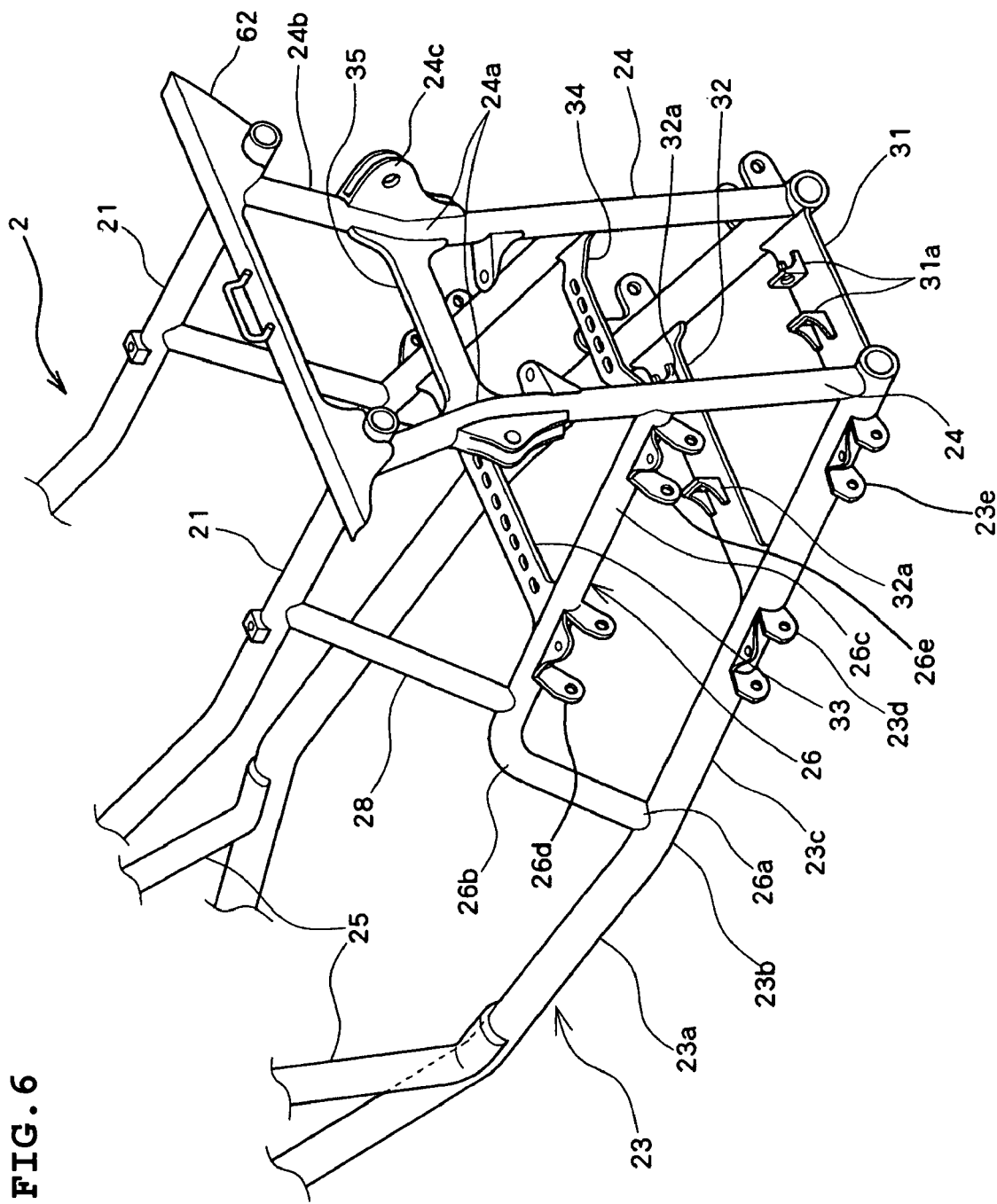
FIG. 6 is a perspective view of a rear portion of the vehicle body frame mounted on the all terrain vehicle.
Figure 7:
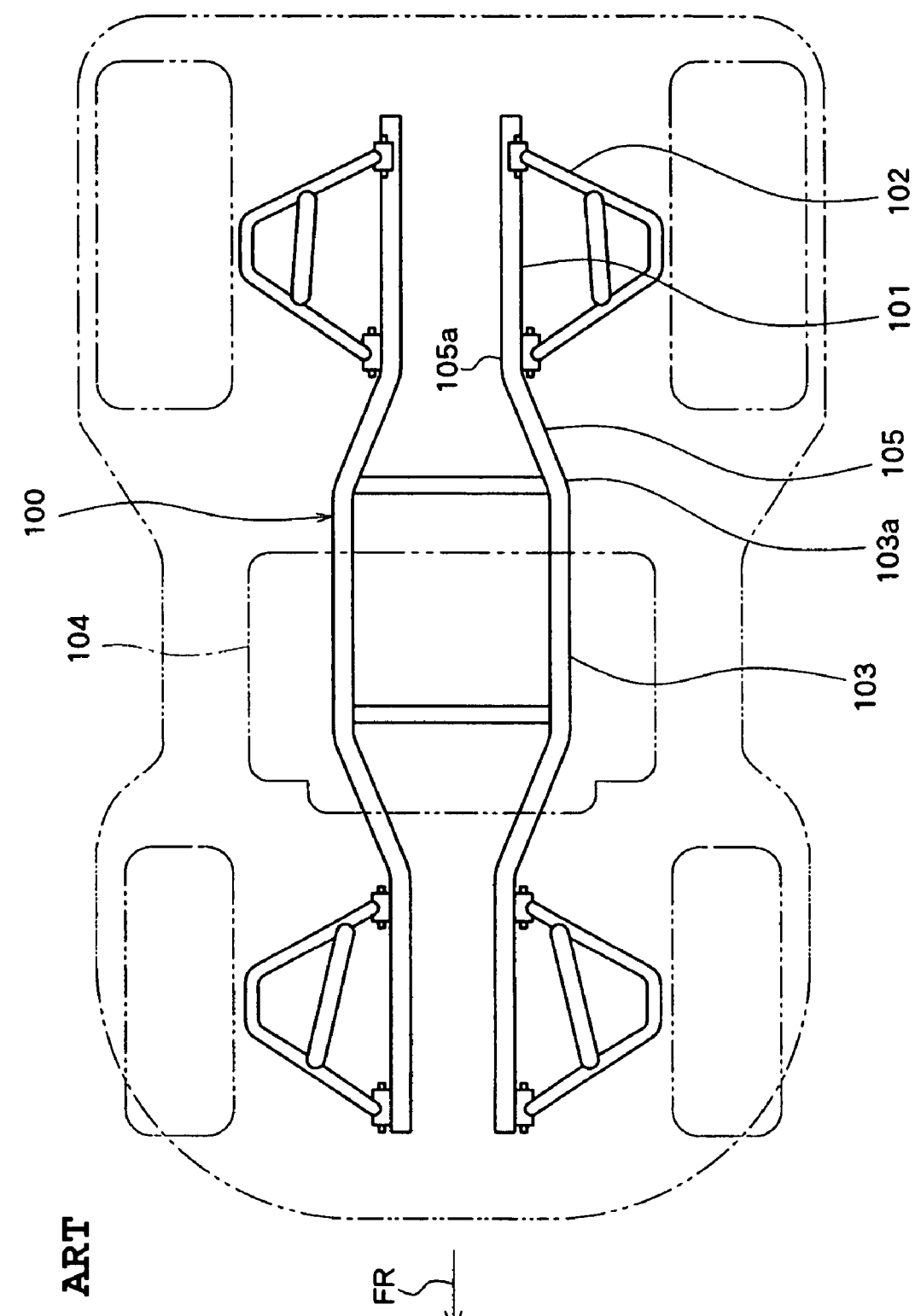
FIG. 7 is a plan view of a vehicle body frame provided in a conventional all terrain vehicle.

Preferred embodiments of an all terrain vehicle of the present invention will be described with reference to the drawings. FIG. 1 is a left side elevation view of an all terrain vehicle 1 of a preferred embodiment of the present invention, and FIG. 2 is a plan view of the all terrain vehicle 1 FIG. 3 is a rear view of rear wheel suspensions 10 provided in the all terrain vehicle 1. FIG. 4 is a plan view of the rear wheel suspensions 10. FIG. 5 is a bottom view of the rear wheel suspensions 10. FIG. 6 is a perspective view of a rear portion of the vehicle body frame 2 provided in the all terrain vehicle 1.

As shown in FIG. 1, the all terrain vehicle 1 includes an engine unit 11 at a central portion of the vehicle. A front end of a rear wheel output shaft 12 is connected to the engine unit 11. A rear end of the rear wheel output shaft 12 is connected to a rear wheel reduction unit 14 arranged at a rear lower portion of the vehicle. Rear wheels 8, 8 are arranged to the left and right of a rear lower portion of the vehicle (refer to FIG. 2). Drive power output from the engine unit 11 is conveyed to the rear wheel output shaft 12 and reduction unit 14, and then is conveyed to the left and right rear wheels 8, 8 via rear wheel drive shafts 15, 15 that are connected to the reduction unit 14 and the left and right rear wheels 8, 8 (refer to FIG. 4).

A fuel tank 50 is arranged in an upper and rear position from the engine unit 11, while a saddle type seat 16 is arranged above this fuel tank 50. A handlebar 51 for a user to steer the vehicle is arranged above a front portion of the engine unit 11, and a steering shaft 52 extending diagonally down is attached to a central portion of the handlebar 51. Grips 51a are attached to the left and right ends of the handlebar 51. A gear shift lever 53 for a rider to change gears is arranged below the left grip 51a.

The all terrain vehicle 1 is provided with a front fender 36, arranged above the left and right front wheels 4, 4, a rear fender 37, arranged above the rear wheels 8, 8, and a cowling 38 covering a front portion of the fuel tank 50, the engine unit 11, etc. A vehicle cover provided with the front fender 36, the rear fender 37 and the cowling 38 etc. functions as a mudguard.

The all terrain vehicle 1 is provided with a vehicle body frame 2 extending from a front portion of the vehicle towards the rear. An upper portion of the vehicle body frame 2 is provided with left and right upper pipes 21, 21 that define an upper portion of the frame and extend in the front and rear direction of the vehicle. The upper pipes 21 curve downward at bent portions 21a. Front pipe portions 22 extending from the bent portions 21a are inclined diagonally downward. Also, the lower portion of the vehicle body frame 2 is provided with left and right lower pipes 23, 23 extending in the front and rear direction of the vehicle. Rear pipes 24, 24 extend from the rear ends of the lower pipes 23 to rear ends of the upper pipes 21.

The vehicle body frame 2 is also provided with substantially L-shaped left and right front suspension arm support pipes 25, 25 and similarly substantially L-shaped left and right rear suspension arm support pipes 26, 26. Front ends of the front suspension arm support pipes 25 are connected to the front pipe portions 22, and rear ends of the front suspension arm support pipes 25 are connected to the lower pipes 23.

The front ends 26a of the rear suspension arm support pipes 26 are connected to the lower pipe portions 23, and rear ends of the rear suspension arm support pipes 26 are connected to the rear pipes 24.

Front reinforcement pipes 27 are fastened between the front suspension arm support pipes 25 and portions slightly to the rear of the bent portions 21a of the upper pipes 21. Rear reinforcement pipes 28 are also fastened between the rear suspension support portions 26 and the upper pipes 21. A cross member 62 is fastened between rear ends of the left and right upper pipes 21, 21 (refer to FIG. 2).

Left and right front wheels 4, 4 are arranged at a front lower portion of the vehicle. The left and right front wheels 4, 4 are supported by left and right front wheel suspensions 6, 6, respectively. The front wheel suspensions 6 are connected to a front portion of the lower pipes 23 and the front suspension arm support pipes 25 so as to be capable of moving up and down.

Left and right rear wheels 8, 8 are supported by left and right rear wheel suspensions 10, 10, respectively. Each of the rear wheel suspensions 10 is connected to the rear portions of the lower pipes 23 and the rear suspension arm support pipes 26 so as to be capable of moving up and down.

The front wheel suspensions 6 and the rear wheel suspensions 10 define a so-called double wishbone type suspension system. Each of the front wheel suspensions 6 includes a front side lower arm (not shown) connected to a front portion of the lower pipe 23, and a front side upper arm (not shown) connected to the front suspension arm support pipe 25. Front wheel shock absorbers 41 for damping vibrations when running are attached to each of the front lower arms.

Also, each of the rear wheel suspensions 10 is provided with a rear side lower arm 42 connected to a rear portion of the lower pipe 23, and a rear side upper arm 43 connected to the rear suspension support pipe 26 (refer to FIG. 3). Rear wheel shock absorbers 40 for damping vibrations when running are attached to each of the rear side lower arms 42. The rear wheel suspensions 10 will be described in detail later.

A rear portion of the vehicle body frame 2 will now be described in detail. As described above, the vehicle body frame 2 is provided with the upper pipes 21 extending in a front and rear direction, and the lower pipes 23 similarly extending in a front and rear direction. The rear portions of left and right upper pipes 21, 21 are arranged to be almost parallel to each other (refer to FIG. 2 and FIG. 6).

As shown in FIG. 4 and FIG. 6, each of the lower pipes 23 is provided with a central portion 23a for supporting the engine unit 11 etc., and a bent portion 23b bending inward in the vehicle width direction (toward the center in the vehicle width direction) at a rear end of the central portion 23a. Each of the lower pipes 23 is provided with a lower arm support portion (suspension arm support portion) 23c extending from the bent portion 23b toward the rear. The left and right lower arm support portions 23c are inclined inward in the vehicle width direction.

The lower arm support portions 23c support the rear wheel differential reduction unit 14 at their rear portions. Specifically, a reduction unit support back cross member 31 is fastened between a rear end of the left and right lower arm support portions 23c, 23c (refer to FIG. 6). A reduction unit support front cross member 32 is also fastened between mid-portions of the left and right lower arm support portions 23c. Left and right reduction unit support portions 31a, 32a are provided on upper surfaces of the reduction unit support back cross member 31 and the reduction unit support front cross member 32, respectively. The differential reduction unit 14 is fixed to the reduction unit support portions 31a, 32a preferably using bolts or other fastening elements.

As described above, the rear suspension arm support pipes 26 are preferably substantially L-shaped. The front end portions 26a of the rear suspension arm support pipes 26 are joined to the bent portions 23b of the lower pipes 23. After extending upwards from the front end portions 26a, the rear suspension arm support pipes 26 bend to the rear at the bent portions 26b. From the bent portions 26b, the upper arm support portions 26c extend to the rear. The rear ends of the upper arm support portions 26c are joined to mid-portions of the rear pipes 24.

Each of the upper arm support portions 26c is inclined to the inside in the vehicle width direction, similarly to the lower arm support portions 23c of the lower pipes 23, and is arranged on a vertical plane including the lower arm support portion 23c. Cross members 33, 34 are also fastened between the left and right upper arm support portions 26c.

The left and right rear pipes 24 extend vertically from lower ends, and bend slightly outward in the vehicle width direction, at bent portions 24a. Inclined portions 24b extending upward from the bent portions 24a are inclined outward in the vehicle width direction, respectively. A cross member 35 is fastened between the left and right bent portions 24a, 24a.

The rear wheel suspensions 10 will now be described in detail. In the following, the left side suspension 10 will be described, but the right side suspension 10 is similar in structure to the left side.

As described above, the rear wheel suspension 10 includes a rear side lower arm 42 (described as a lower arm in the following) and a rear side upper arm 43 (described as an upper arm in the following).

First, the lower arm 42 will be described. The lower arm 42 is substantially U-shaped. As shown in FIG. 5, lower arm 42 is provided with a lower front arm portion 42a extending from the vehicle to the rear wheel 8 and bending rearward at a bent portion 42f, and a lower back arm portion 42b extending from the bent portion 42f of the lower front arm portion 42a back to the vehicle. The lower front arm portion 42a and the lower back arm portion 42b are connected to the lower arm support portion 23c of the lower pipe 23 so as to be capable of moving up and down.

Specifically, the lower front arm portion 42a and the lower back arm portion 42b respectively have pipe shaped boss portions 42c, 42d at their ends. The centerlines of the boss portions 42c, 42d are preferably substantially parallel to the lower arm support portion 23c. Brackets 23d and 23e projecting outwardly in a vehicle width direction are provided on the front portion and rear portion of the lower arm support portion 23c. A frame side pivot shaft 23f parallel to the lower arm support portion 23c is inserted into the boss portion 42c. The bracket 23d supports this frame side pivot shaft 23f axially. Similarly, a frame side pivot shaft 23g is inserted into the pipe-shaped boss portion 42d. The bracket 23e supports this frame side pivot shaft 23g axially. Therefore, the lower front arm portion 42a and the lower back arm portion 42b are capable of moving up and down.

Incidentally, the lower front arm portion 42a and the lower back arm portion 42b extend diagonally rearward and outward in a vehicle width direction. Also, a reinforcement member 42g is provided between the front side lower arm 42a and the rear side lower arm 42b.

Next, the upper arm 43 will be described. The upper arm 43 is substantially U-shaped. As shown in FIG. 4, the upper arm 43 is provided with an upper front arm portion 43a extending from the vehicle to the rear wheel 8 and bending rearward at a bent portion 43f positioned at the rear wheel 8, and an upper back arm portion 43b extending from the bent portion 43f of the upper front arm portion 43a back to the vehicle. The upper front arm portion 43a and the upper back arm portion 43b are connected to the upper arm support portion 26c so as to be capable of moving up and down.

Specifically, the upper front arm portion 43a and the upper back arm portion 43b include pipe-shaped boss portions 43c, 43d at end portions at the vehicle side, respectively. Brackets 26d and 26e that project outwardly in a vehicle width direction are fixed to the front portion and rear portion of the upper arm support portion 26c. A frame side pivot shaft 26f parallel to the upper arm support portion 26c is inserted into the pipe-shaped boss portion 43c. The bracket 26d supports this frame side pivot shaft 26f and boss portion 43c axially. Similarly, a frame side pivot shaft 26g is inserted into the boss portion 43d. The bracket 26e supports this frame side pivot shaft 26g and the boss portion 43d axially.

The upper front arm portion 43a and the upper back arm portion 43b extend diagonally rearward and outward in the vehicle width direction. Also, as described above, the lower arm 42 also extends diagonally rearward and outward in the vehicle width direction. Additionally, the rear wheel drive shaft 15 for connecting the differential reduction unit 14 and the rear wheel 8 extends diagonally rearward and outward in the vehicle width direction.

The rear wheel shock absorber 40 is arranged between the lower back arm portion 42b of the lower arm 42, and the rear pipe 24. Specifically, lower end 40a of the rear wheel shock absorber 40 is fixed to bracket 42i projecting upward at a mid-portion of the lower back arm portion 42b (refer to FIG. 3). An upper end 40b of the rear wheel shock absorber 40 is fixed to bracket 24c projecting outward in the vehicle width direction, at a mid-portion of the rear pipe 24. The rear pipe 24 and the lower back arm portion 42b of the lower arm 42 are positioned further to the rear than the upper back arm portion 43b of the upper arm 43. Therefore, the body portion 40c (telescopic portion) of the rear wheel shock absorber 40 is positioned to the rear of the rear side upper arm 43 (refer to FIG. 4).

As described above, a pair of arms including the upper arm 43 and the lower arm 42 support the rear wheel 8, and are capable of moving up and down together with the rear wheel 8. Specifically, the upper arm 43 includes a bracket 43h projecting outward in the vehicle width direction, at the bent portion 43f. A knuckle 44 for supporting the rear wheel 8 hub (not shown) is arranged at an inner side of the rim of the rear wheel 8. The knuckle 44 includes a linkage arm 44c extending diagonally upward and inward in the vehicle width direction, and a linkage arm 44d extending diagonally downward and inward (refer to FIG. 3). A wheel side pivot shaft 44a that is parallel to the upper arm support portion 26c is inserted into the upper portion of the linkage arm 44c. A wheel side pivot shaft 44b that is parallel to the lower arm support portion 23c is inserted into the lower portion of the linkage arm 44d. The bracket 43h of the upper arm 43 axially supports the vehicle side pivot shaft 44a and the linkage arm 44d.

On the other hand, the lower arm 42 includes a bracket 42h projecting outward in the vehicle width direction, at the bent portion 42f. The bracket 42h axially supports the vehicle side pivot shaft 44b inserted into the linkage arm 44d. In this way, a pair of arms including the upper arm 43 and the lower arm 42 are capable of moving up and down together with the rear wheel 8.

Incidentally, an opening is provided in a central portion 44e of the knuckle 44. A constant velocity joint (not shown) for conveying drive power while moving up and down with the rear wheel 8 is arranged at an inner side of the opening of the knuckle 44.

Also, the vehicle side pivot shaft 44b and vehicle side pivot shaft 44a, and the frame side pivot shafts 23f, 23g axially supported in the lower arm support portions 23c and the frame side pivot shafts 26f, 26g axially supported in the upper arm support portions 26c, are parallel to each other.

In the all terrain vehicle 1 described above, the lower pipe 23 includes the lower arm support portion 23c supporting the lower arm 42 at the rear portion of the lower pipe 23. This lower arm support portion 23c is inclined to the inside in the vehicle width direction. As a result, there is no need for the difficult frame processing of bending each of the lower pipes 23 at two places in order to make the lower arm support portions 23c parallel. This means that an all terrain vehicle including a more compact vehicle body frame can be obtained.

Also, in the all terrain vehicle 1, two pairs of arms including the lower arms 42 and the upper arms 43 are inclined towards the rear, and the rear wheel drive shafts 15 are inclined toward the rear. As a result, the rear wheels 8 are positioned further to the rear of the vehicle. Therefore, the rear portion of the vehicle is prevented from contacting the ground even when running on uneven ground.

The present invention is not limited to the above-described preferred embodiments, but can be modified within the scope of the attached claims. Further, the technologies disclosed in above-described preferred embodiments can be used in combination, as desired.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An all terrain vehicle comprising:
   left and right vehicle body frame portions extending in a front and rear direction of the vehicle, the left and right vehicle body frame portions including bent portions bent inward in a vehicle width direction and suspension arm support portions extending from the bent portions toward the rear of the vehicle, the suspension arm support portions being inclined inward in the vehicle width direction;
   left and right suspension arms, respectively suspending left and right rear wheels, capable of moving up and down together with the rear wheels; and
   left and right rear wheel drive shafts connected to the rear wheels for conveying drive power, the left and right rear wheel drive shafts extending from a center portion of the vehicle both diagonally rearward and outward in the vehicle width direction toward a rear of the vehicle; wherein
   the left and right rear wheel drive shafts extend to the center of the left and right rear wheels, respectively;
   the left and right suspension arms are directly attached to the suspension arm support portions at a location where the suspension arm support portions are inclined inward; and
   each of the left and right suspension arms includes an upper arm and a lower arm, each of the lower arms directly attached to the suspension arm support portions at a location where the suspension arm support portions are inclined inward.

2. The all terrain vehicle of claim 1, wherein each of the suspension arm support portions is provided with frame side pivot shafts for supporting the suspension arm so as to be capable of moving up and down, each of the suspension arms is provided with wheel side pivot shafts for supporting a rear wheel so as to be capable of moving up and down, and each of the frame side pivot shafts of the suspension arm support portions is parallel with the wheel side pivot shafts of each of the suspension arms.

3. The all terrain vehicle of claim 1, further comprising shock absorbers for damping vibrations of the vehicle, wherein an upper end of each of the shock absorbers is connected to the vehicle body frame portion, and a lower end of each of the shock absorbers is connected to the lower arm.

4. The all terrain vehicle of claim 1, wherein the suspension arm support portions are not parallel to each other.

5. The all terrain vehicle of claim 1, wherein the bent portions of the vehicle body frame portions are wider in the vehicle width direction than the suspension arm support portions inclined inward in the vehicle width direction.

6. The all terrain vehicle of claim 1, wherein each of the upper arms is directly attached to the suspension arm support portions at a location where the suspension arm support portions are inclined inward.

* * * * *